United States Patent [19]

Gravitt et al.

[11] Patent Number: 4,997,484

[45] Date of Patent: Mar. 5, 1991

[54] HYDRAULIC CEMENT AND COMPOSITION EMPLOYING THE SAME

[75] Inventors: Billy B. Gravitt, Katy; Richard F. Heitzmann, Pearland; James L. Sawyer, Friendswood, all of Tex.

[73] Assignee: Lone Star Industries, Inc., Stamford, Conn.

[21] Appl. No.: 533,361

[22] Filed: Jun. 5, 1990

Related U.S. Application Data

[63] Continuation-in-part of Ser. No. 425,577, Oct. 23, 1989, abandoned, which is a continuation-in-part of Ser. No. 133,433, Dec. 11, 1987, abandoned.

[51] Int. Cl.$^5$ ................................................ C04B 7/28
[52] U.S. Cl. .................................... 106/708; 106/705; 106/DIG. 1
[58] Field of Search ................. 106/705, 708, DIG. 1, 106/85, 315

[56] References Cited

U.S. PATENT DOCUMENTS

| Re. 30,943 | 8/1982 | Nicholson | 106/DIG. 1 |
| 3,856,541 | 12/1974 | Martin | 106/315 X |
| 3,954,489 | 5/1976 | Uchikawa et al. | 106/315 X |
| 4,101,332 | 7/1978 | Nicholson | 106/DIG. 1 |
| 4,137,093 | 1/1979 | Poblano | 106/315 X |
| 4,190,454 | 2/1980 | Yamagisi et al. | 106/315 X |
| 4,256,500 | 3/1981 | Turpin, Jr. | 106/DIG. 1 |
| 4,306,912 | 12/1981 | Forss | 106/315 X |
| 4,313,763 | 2/1982 | Turpin, Jr. | 106/DIG. 1 |
| 4,432,800 | 2/1984 | Kneller et al. | 106/DIG. 1 |
| 4,715,896 | 12/1987 | Berry | 106/DIG. 1 |
| 4,842,649 | 6/1989 | Heitzmann | 106/DIG. 1 |

Primary Examiner—Karl Group
Attorney, Agent, or Firm—Darby & Darby

[57] ABSTRACT

A hydraulic cement is formed from a Class C fly ash, an alkali metal activator, and citric acid. Mortar and concrete compositions can be prepared with this hydraulic cement. The cement is particularly useful in producing mortar and concrete compositions that achieve high strengths in a short time, in particular, a mortar having a strength of at least 2500 psi in 24 hours, when cured at room temperature.

24 Claims, No Drawings

HYDRAULIC CEMENT AND COMPOSITION EMPLOYING THE SAME

CROSS REFERENCE TO RELATED APPLICATION

This application is a continuation-in-part of application Ser. No. 425,577, filed Oct. 23, 1989, for "HYDRAULIC CEMENT AND COMPOSITION EMPLOYING THE SAME," which was a continuation-in-part of application Ser. No. 133,433, filed Dec. 11, 1987, for "HYDRAULIC CEMENT AND COMPOSITION EMPLOYING THE SAME," each listing, as inventors, Billy B. Gravitt, Richard F. Heitzmann, and James L. Sawyer, and each assigned to the same assignee as the present application.

BACKGROUND OF THE INVENTION

Hydraulic cements, such as portland cement and blended hydraulic cements, consisting of portland cement and pozzolans, have, for many years, been used as an essential ingredient of the mortar and concrete used for construction of structures, highways, etc. In many instances, fly ash has been used as the pozzolanic component in blended hydraulic cements, and as a mineral admixture to replace part of the more expensive portland cement used in mortar or concrete. The use of fly ash, in place of part of the portland cement or as a constituent in blended cements reduces the large amount of energy required to produce the hydraulic cements required for mortar and concrete. However, the prior art has taught that no more than 35 to 45 per cent of the portland cement can be replaced with fly ash. According to the teachings of the prior art, when more fly ash than that is employed, the resulting mortars and concretes do not have sufficient strength.

Fly ash, particularly Class C fly ash, is a waste material. Many million of pounds of this material are produced each year and must be disposed of. Because this fly ash contains potentially dangerous heavy metals, disposal is becoming a more and more significant problem. While merely adding water to the waste fly ash will cause it to harden, as is true of many solid materials, the hardened product has no significant strength, and the disposal problem is merely changed, without being solved.

Because of the significant waste disposal problem, uses have long been sought for this fly ash, but these uses have generally involved merely hardening the fly ash, as indicated above, an operation which does not provide a material with sufficient strength for any useful purpose.

Though the fly ash can be blended with portland cement to create a useful product, as indicated above, the amounts which can be used are limited, so that the massive amounts of this waste material available are not consumed. Also as indicated, merely hardening the waste material does not really provide for its effective utilization. To avoid the substantial costs of energy involved in producing cement, generally between $3 and $11 per ton, at current rates, if the fly ash, where there is no energy cost, because it is a waste material, could be used for structural uses, an extremely desirable situation would be created. This desirable situation is not accomplished through a mere hardening of the materials, as described, for example, in U.S. Pat. No. 4,101,332, Nicholson and U.S. Pat. No. 4,432,280, Kneller, et al.

It now has been found, however, according to the present invention, that a hydraulic cement, where all of the portland cement or blended hydraulic cement is replaced with fly ash, can be formed by activating a Class C fly ash with an alkali metal material, along with citric acid. Through employment of the composition of the present invention, a waste material, Class C fly ash, with relatively small amounts of activators and other conditioning agents, forms a useful, structural cement without the utilization of the energy otherwise required for such materials.

Not only is the fly ash employed for production of a usable, structural material, without the expenditure of significant energy costs, but, in addition, the costs which would otherwise be attributed to the disposal of the fly ash are avoided.

BRIEF DESCRIPTION OF THE INVENTION

In accordance with the present invention, a hydraulic cement composition is provided consisting essentially of Class C fly ash, an alkali metal activator, and a further modifying agent, citric acid.

The hydraulic cement of the present invention has the following components, by weight, per 100 parts of total cement:
About 90.8 to 99 parts Class C fly ash
About 0.4 to 4.2 parts alkali metal activator
About 0.6 to 5 parts citric acid
About 0 to 3 parts set control materials The amount of alkali metal activator set forth in the formulation is for potassium hydroxide. The potassium hydroxide can be replaced with other alkali metal materials, in particular, sodium hydroxide, potassium carbonate, and sodium carbonate. However, to attain the strengths required in accordance with the present invention, additional amounts of the substitute alkali metal materials must be employed.

Further, the broad citric acid and alkali metal ranges do not apply over the full span. For example, when a citric acid percent of from 0.6 to 1.0% is employed, the potassium hydroxide should range from about 1.7 to 2.0%; on the other hand, when 5% citric acid is employed, the amount of potassium hydroxide can range from 0.4 to 4.2%.

With this composition of matter, a structural cement is produced. Such a structural cement is one which when incorporated in a mortar attains a strength of at least 2500 psi in one day, when cured at room temperature. Substantially greater strengths can be obtained, and, with longer curing times, are obtained; and employing heat to aid in the curing process will increase the strength.

Among the set control materials which can be employed are borax, Cormix, WRDA, Daracem 100, or other admixtures commonly used in concrete formulations. The admixture, when used, can comprise from about ½ to 3 parts, by weight, of at least one of the referenced materials per 100 total parts of cement composition, which includes the fly ash, alkali metal material, and citric acid.

This hydraulic cement achieves both high early strengths and high ultimate strengths. It can be utilized for rapid concrete repair or construction. This cement can be utilized in the production of precast and prestressed concrete, with or without heat curing.

In addition to the materials in the above formulation, other materials can be added to the composition, as, for example, retarders and water reducers commonly used in concrete formulations.

When the hydraulic cement of the present invention is used in concrete or mortar, the resulting hardened material has sufficient strength that it can be put into service a few hours after being placed. This strength can be obtained with or without heat curing. As indicated, the strength of the hydraulic cement of the present invention, as a mortar, is at least 2500 psi after curing for one day at room temperature.

DESCRIPTION OF PREFERRED EMBODIMENTS

The hydraulic cement of the present invention has the following components by weight:
 About 90.8 to 99 parts Class C fly ash
 About 0.4 to 4.2 parts alkali metal activator
 About 0.6 to 5 parts citric acid
 About 0 to 3 parts set control materials
The fly ash is a Class C fly ash as classified in ASTM C-618.

When potassium hydroxide, the preferred alkali metal activator, is used as the alkali metal activator, it can be in the form of flakes, pellets, or water solution. Sodium hydroxide, potassium carbonate and sodium carbonate, can also be utilized as a source of alkali metal ions.

The citric acid can be in any available grade, such as fine crystal, powder, or liquid. Salts of citric acid can also be used.

Borax, a mineral with the composition $Na_2O.2B_2O_3.10H_2O$., can be used as an admixture in any available grade and can be replaced, all or in part, by other available admixtures that control the set of concrete mixtures.

The major distinction between the cement of the present invention and prior art is the use of fly ash with an alkali metal activator and citric acid to produce a hydraulic cement with very early strengths, and without portland cement.

All of the components can be interground or interblended and used as a complete cement without additional admixtures. In an alternative, the sources of the alkali metal ion, citric acid, and other admixtures, may be added at the concrete mixer, in a dry or liquid form, as an admixture or as a second component. When all of the materials are blended together, so that only water and aggregate are required to obtain a mortar or concrete, the control problems that can occur when materials are mixed in the field are eliminated or minimized. On the other hand, when the various materials are blended in the field, there is an economy of storage and shipping. In addition, the two component procedure does allow for greater control of working time.

Of importance in forming the cement composition of the present invention is the ratio of water to the cement forming constituents, i.e., the fly ash, alkali metal material, and citric acid. This range should be from 0.165 to 0.220 part water for each part of the cement forming constituents. Preferably, the range is from 0.18 to 0.22. With the water ratios set forth, a slump test value of approximately 2 inches to 4 inches is obtained. In the construction industry, this is considered to be a fairly workable mixture. Further, in forming the mortar, it has been found that an appropriate ratio of fly ash to sand is 1.0:1.5–3.0, preferably 1.0:1.5–2.5.

With the various ratios given, the mortars formed provide a compressive strength of 2,500 psi within 24 hours with a slump which provides appropriate workability and, additionally, with a plasticity time of at least 6 minutes. While, when the cement composition in accordance with the present invention is employed for small areas, such as patches, a lower plasticity time is acceptable, for large jobs, a lower time is not sufficient. Of course, the plasticity time can be increased by adding appropriate set retarding agents to the mixture.

As indicated earlier, the amount of potassium hydroxide to be employed in the cement composition of the present invention varies in accordance with the amount of citric acid used. Based upon the examples run, the following approximate ranges have been found to apply to obtain compressive strengths of at least 2,500 psi when the mortar has a sand/fly ash ratio of 1.5:1.

| Citric Acid Percentage | Potassium Hydroxide Percentage Range |
| --- | --- |
| 0.6 | 1.7 to 1.8 |
| 0.7 | 1.7 to 1.9 |
| 0.8 | 1.7 to 1.9 |
| 0.9 | 1.7 to 2 |
| 1 | 1.7 to 2 |
| 1.1 | 1.6 to 2.1 |
| 1.2 | 1.6 to 2.1 |
| 1.3 | 1.6 to 2.2 |
| 1.4 | 1.5 to 2.2 |
| 1.5 | 1.5 to 2.3 |
| 1.6 | 1.5 to 2.3 |
| 1.7 | 1.4 to 2.3 |
| 1.8 | 1.4 to 2.4 |
| 1.9 | 1.4 to 2.5 |
| 2 | 1.3 to 2.5 |
| 2.1 | 1.3 to 2.6 |
| 2.2 | 1.3 to 2.6 |
| 2.3 | 1.2 to 2.7 |
| 2.4 | 1.2 to 2.7 |
| 2.5 | 1.1 to 2.8 |
| 2.6 | 1.1 to 2.8 |
| 2.7 | 1.1 to 2.9 |
| 2.8 | 1 to 2.9 |
| 2.9 | 0.9 to 2.9 |
| 3 | 0.9 to 3 |
| 3.1 | 0.7 to 3 |
| 3.2 | 0.4 to 3.1 |
| 3.3 | 0.4 to 3.2 |
| 3.4 | 0.4 to 3.2 |
| 3.5 | 0.4 to 3.2 |
| 3.6 | 0.4 to 3.3 |
| 3.7 | 0.4 to 3.3 |
| 3.8 | 0.4 to 3.3 |
| 3.9 | 0.4 to 3.4 |
| 4 | 0.4 to 3.4 |
| 4.1 | 0.4 to 3.5 |
| 4.2 | 0.4 to 3.5 |
| 4.3 | 0.4 to 3.5 |
| 4.4 | 0.4 to 3.6 |
| 4.5 | 0.4 to 3.6 |
| 4.6 | 0.4 to 3.7 |
| 4.7 | 0.4 to 3.7 |
| 4.8 | 0.4 to 3.7 |
| 4.9 | 0.4 to 3.8 |
| 5 | 0.4 to 3.8 |

In general, when the sand/fly ash ratio is increased to 2.0:1, and above, the lower end of the particular potassium hydroxide range should be increased by 0.2% and, the upper end of that range by 0.4%.

As indicated, the potassium hydroxide can be substituted by sodium hydroxide, potassium carbonate, or sodium carbonate. However, when using these materials, increased amounts must be employed. For example, with sodium hydroxide and potassium carbonate, approximately twice as much should be employed as indicated in the above table for potassium hydroxide, while with sodium carbonate, the amount must be increased approximately four fold. An added benefit, however, from the carbonates is that the plasticity time is substantially increased.

The following are given as examples of formulations of the hydraulic cement of the present invention. They should be considered only as illustrative and not as limiting, in any way, the full scope of the invention as covered in the appended claims. All parts are by weight. The Class C fly ash used in the following examples had the properties set forth below:

| CLASS C FLY ASH CHEMICAL ANALYSIS (AS RECEIVED %) | |
|---|---|
| $SiO_2$ | 37.60 |
| $Al_2O_3$ | 20.47 |
| $Fe_2O_3$ | 5.44 |
| CaO | 21.54 |
| MgO | 4.61 |
| $SO_3$ (by LECO Furnace 2.12%) | 1.71 |
| $Na_2O$ | 2.78 |
| $K_2O$ | 0.52 |
| $TiO_2$ | 1.05 |
| SrO | 0.65 |
| Loss | 0.41 |

| FINENESS |
|---|
| SIEVE No. 325 = 82.3% passing |
| BLAINE = 4270 $cm^2/g$ |

| X-RAY DIFFRACTION - CRYSTAL STRUCTURES PRESENT: | |
|---|---|
| (1) $SiO_2$ | (silicon oxide) |
| (2) $Fe_2O_3$ | (iron oxide) |
| (3) MgO | (magnesium oxide) |
| (4) CaO | (calcium oxide) |
| (5) $TiO_2$ | (titanium oxide) |

EXAMPLE 1

A cement mixture was formed consisting of:
96.29 parts Class C fly ash
1.41 parts potassium hydroxide
1.28 parts citric acid
1.02 parts borax

EXAMPLE 2

A concrete was prepared employing the cement of Example 1 and other necessary materials as indicated below:
825 parts of cement as Example 1
1213 parts sand
1820 parts gravel
142 parts water The various materials were mixed in a concrete mixer. The concrete had an open or working time of 25 minutes. Part of the concrete was cast in molds and cured at ambient temperature (73° F.). This concrete had compressive strengths as follows:

| Age | Strength |
|---|---|
| 3 hours | 1,800 psi |
| 4 hours | 2,000 psi |
| 1 day | 4,000 psi |
| 3 days | 6,600 psi |
| 7 days | 8,800 psi |
| 28 days | 10,400 psi |

The remaining concrete was cast in molds and stored at ambient temperature (73° F.) for one hour, then cured in steam at 195° F. for one and one-half hours. Specimens were then cured in ambient (73° F.) air until tested. This concrete had compressive strengths as follows:

| Age | Strength |
|---|---|
| 3 hours | 3,600 psi |
| 4 hours | 4,800 psi |
| 1 day | 5,700 psi |
| 3 days | 6,600 psi |
| 7 days | 7,600 psi |
| 28 days | 9,400 psi |

EXAMPLE 3

A cement mixture was formed consisting of:
95.98 parts Class C fly ash
1.40 parts potassium hydroxide
1.28 parts citric acid
1.02 parts borax
0.05 part Cormix 2000 CP Cormix 2000 CP is a sodium salt of a copolymer of an unsaturated carboxylic acid and the hydroxyaklyl ester of such an acid. Cormix meets the requirements of ASTM C-494 as a Type G admixture (water-reducing, high range, and retarding admixture).

EXAMPLE 4

A concrete was prepared employing the cement of Example 3 and other necessary materials as indicated below:
827 parts of cement of Example 3
1362 parts sand
1669 parts gravel
142 parts water The various materials were mixed in a concrete mixer. The concrete had an open or working time of 20 minutes. Part of the concrete was cast in molds and cured at ambient temperature (73° F.). This concrete had compressive strengths of 2,000 psi at 4 hours, 4,200 psi at 1 day, and 7,600 psi at 7 days.

The remaining concrete was cast in molds and stored at ambient temperatures (73° F.) for one hour, then cured at 195° F. for one and one-half hours. Specimens were then cured in ambient (73° F.) air until tested. This concrete had compressive strengths of 5,000 psi at 4 hours, 6,500 psi at 1 day, and 7,600 psi at 7 days.

EXAMPLE 5

A cement mixture was formed consisting of:
5.98 parts of Class C fly ash
1.40 parts potassium hydroxide
1.28 parts citric acid
1.02 parts borax
0.05 part Cormix 2000 cp The Cormix 2000 is the sodium salt of a copolymer of an unsaturated carboxylic acid and the hydroxyalkyl ester of that acid. The material meets the requirements of ASTM C-86, as a type G admixture, one which is water-reducing, high range, and retarding.

EXAMPLE 6

A concrete was prepared employing the cement of Example 5 and other necessary materials as indicated below:
- 827 parts of cement of Example 5
- 1362 parts sand
- 1669 parts gravel
- 142 parts water The various materials were mixed in a concrete mixer. The concrete had an open or working time of 32 minutes. Part of the concrete was cast in molds and cured at ambient temperature (73° F.). This concrete had compressive strengths of 1,300 psi at 4 hours, 2,800 psi at 1 day, and 5,500 psi at 7 days.

The remaining concrete was cast in molds and stored at ambient temperature (73° F.) for one hour, then cured at 195° F. for one and one-half hours. Specimens were then cured in ambient (73° F.) air until tested. This concrete had compressive strengths of 2,200 psi at 4 hours, 3,200 psi at 1 day, and 4,500 psi at 7 days.

EXAMPLE 7

A cement mixture was made consisting of:
- 95.98 parts Class C fly ash
- 1.40 parts potassium hydroxide
- 1.28 parts citric acid
- 1.02 parts borax
- 0.05 part WRDA-79P WRDA 79-P is a modified lignosulfonate, with catalyst. It meets the requirements of ASTM C-494 as a Type 4 admixture (water-reducing admixture) and Type D admixture (waterreducing and retarding admixture).

EXAMPLE 8

A concrete was prepared employing the cement of Example 7 and other necessary materials as indicated below:
- 827 parts of cement of Example 7
- 1362 parts sand
- 1669 parts gravel
- 142 parts water The various materials were mixed in a concrete mixer. The concrete had an open or working time of 28 minutes. Part of the concrete was cast in molds and cured at ambient temperature (73° F.). This concrete had compressive strengths of 1,900 psi at 4 hours, 3,600 psi at 1 day, and 7,600 psi at 7 days.

The remaining concrete was cast in molds and stored at ambient temperatures (73° F.) for one hour, then cured at 195° F. for one and one-half hours. Specimens were then cured in ambient (73° F.) air until tested. This concrete had compressive strengths of 2,900 psi at 4 hours, 4,200 psi at 1 day, and 5,800 psi at 7 days.

EXAMPLE 9

A cement mixture was made consisting of:
- 95.98 parts Class C fly ash
- 1.40 parts potassium hydroxide
- 1.28 parts citric acid
- 1.02 parts borax
- 0.05 part Daracem 100P Daracem 100P is a dispersion of sulfonated naphthalene formaldehyde condensate, a gluconate, and a lignosulfonate. Daracem 100P meets the requirements of ASTM C-494 as a Type G admixture (water-reducing high range, and retarding admixture).

EXAMPLE 10

A concrete was prepared employing the cement of Example 9 and other necessary materials as indicated below:
- 827 parts of cement of Example 9
- 1362 parts sand
- 1669 parts gravel
- 142 parts water The various materials were mixed in a concrete mixer. The concrete had an open or working time of 30 minutes. Part of the concrete was cast in molds and cured at ambient temperature (73° F.). This concrete had compressive strengths of 1,900 psi at 4 hours, 3,800 psi at 1 day, and 7,700 psi at 7 days.

The remaining concrete was cast in molds and stored at ambient temperature (73° F.) for one hour, then cured at 195° F. for one and one-half hours. Specimens were then cured in ambient (73° F.) air until tested. This concrete had compressive strengths of 3,800 psi at 4 hours, 4,900 psi at 1 day, and 6,200 psi at 7 days.

EXAMPLE 11

A cement mixture was made consisting of:
- 95.98 parts Class C fly ash
- 1.40 parts potassium hydroxide
- 1.28 parts citric acid
- 1.02 parts borax
- 0.025 part Cormix 2000 cp
- 0.025 part Cormix SP-1P

EXAMPLE 12

A concrete was prepared employing the cement of Example 11 and other necessary materials as indicated below:
- 827 parts of cement of Example 11
- 1362 parts sand
- 1669 parts gravel
- 142 parts water The various materials were mixed in a concrete mixer. The concrete had an open or working time of 25 minutes. Part of the concrete was cast in molds and cured at ambient temperature (73° F.). This concrete had compressive strengths of 2,400 psi at 4 hours and 5,000 psi at 1 day.

The remaining concrete was cast in molds and stored at ambient temperature (73° F.) for one hour, then cured at 195° F. for one and one-half hours. Specimens were then cured in ambient (73° F.) air until tested. This concrete had compressive strengths of 5,100 psi at 4 hours and 7,300 psi at 1 day.

EXAMPLE 13

A mortar was prepared employing the cement of Example 1 and other necessary materials as indicated below:
- 1480 parts of the cement of Example 1
- 2274 parts sand
- 246 parts water The various materials were mixed in a mortar mixer. The mortar had an open or working time of 30 minutes. Part of the mortar was cast in molds and cured at ambient temperature (73° F.). This mortar had compressive strengths as follows:

| Age | Strength |
| --- | --- |
| 2 hours | 2,000 psi |
| 3 hours | 2,300 psi |
| 4 hours | 2,700 psi |
| 1 day | 5,400 psi |
| 3 days | 8,400 psi |
| 7 days | 10,000 psi |
| 28 days | 13,200 psi |

The remaining mortar was cast in molds and stored at ambient temperature (73° F.) for one hour, then cured at 195° F. for one and one-half hours. Specimens were then cured in ambient (73° F.) air until tested. This mortar had compressive strengths as follows:

| Age | Strength |
| --- | --- |
| 4 hours | 4,400 psi |
| 1 day | 5,800 psi |
| 28 days | 12,800 psi |

EXAMPLE 14

A cement mixture was prepared consisting of:
94.95 parts Class C fly ash
3.79 parts potassium carbonate
1.26 parts citric acid

EXAMPLE 15

A mortar was prepared employing the cement of Example 27 and other necessary materials as indicated below:
1482 parts cement of Example 27
2246 parts sand
272 parts water The various materials were mixed in a mortar mixer. The mortar had an open or working time of 30 minutes. The mortar was mixed, cast in molds and cured at ambient temperature (73° F.). The mortar had compressive strength as follows:

| Age | Strength |
| --- | --- |
| 2 hours | 1,100 psi |
| 3 hours | 1,500 psi |
| 4 hours | 1,700 psi |
| 1 day | 4,100 psi |
| 3 days | 5,800 psi |
| 7 days | 8,400 psi |

EXAMPLE 16

Employing the procedures set forth in the previous examples, a cement was prepared consisting of 96% Class C fly ash, 3% citric acid and 1% potassium hydroxide. When a mortar was prepared employing this cement in a ratio of fly ash to sand of 1:1.5, a strength of 2,787 psi was obtained in 24 hours.

In the following examples, the same procedure was used as in Example 16, and employing the same fly ash/sand ratio, with the following:

| Example No. | Percent Fly Ash | Percent Potassium Hydroxide | Percent Citric Acid | psi in 24 hours |
| --- | --- | --- | --- | --- |
| 17 | 96 | 1 | 3 | 2787 |
| 18 | 97 | 2 | 1 | 3583 |
| 19 | 95 | 2 | 3 | 5971 |
| 20 | 94 | 3 | 3 | 7166 |
| 21 | 93 | 3 | 4 | 5971 |
| 22 | 92 | 3 | 5 | 5573 |

The same procedure as in Example 16 were followed in the following examples, but employing a fly ash/sand ratio in the mortar of 1:2.0.

| Example No. | Percent Fly Ash | Percent Potassium Hydroxide | Percent Citric Acid | psi in 24 hours |
| --- | --- | --- | --- | --- |
| 23 | 97 | 2 | 1 | 5056 |
| 24 | 96 | 2 | 2 | 5494 |
| 25 | 95 | 2 | 3 | 5494 |
| 26 | 94 | 2 | 4 | 5175 |
| 27 | 96 | 3 | 1 | 4459 |
| 28 | 95 | 3 | 2 | 5892 |
| 29 | 94 | 3 | 3 | 6847 |
| 30 | 93 | 3 | 4 | 5732 |
| 31 | 92 | 3 | 5 | 3742 |

In the following examples, the same procedures were employed as in Example 16, but using a fly ash/sand ratio in the mortar of 1:2.5.

| Example No. | Percent Fly Ash | Percent Potassium Hydroxide | Percent Citric Acid | psi in 24 hours |
| --- | --- | --- | --- | --- |
| 32 | 97 | 2 | 1 | 2626 |
| 33 | 96 | 2 | 2 | 3742 |
| 34 | 95 | 2 | 3 | 3344 |
| 35 | 94 | 2 | 4 | 2548 |
| 36 | 94 | 3 | 3 | 4857 |
| 37 | 93 | 3 | 4 | 3981 |
| 38 | 92 | 3 | 5 | 4618 |
| 39 | 94 | 4 | 2 | 2548 |
| 40 | 93 | 4 | 3 | 4061 |
| 41 | 92 | 4 | 4 | 4299 |
| 42 | 91 | 5 | 4 | 2627 |

Employing the materials formed in accordance with the present invention, concretes and mortars are formed which passivate steel bars against corrosion. They also have excellent resistance to high temperature, can be cured at low temperature, and cure very rapidly at elevated temperatures. They have superior dimensional stability and good workability.

Concrete or mortar made with the cement in accordance with the present invention can be cast underwater, or can be placed underwater immediately after casting, while still retaining dimensional stability, and will continue to gain strength at a rate determined by the temperature of the water. After removal from the water, the concrete or mortar can be removed and resubmersed without loss of strength.

By properly proportioning the alkali metal activator and the citric acid, the workability time of the mortars, cements, and concretes made in accordance with the present invention can be controlled. For example, with some applications, such as the extrusion of roof and floor tiles, a short workability time may be desired, with a very rapid gain of strength. On the other hand, with cast-in-place concrete, a longer workability time may be desired along with a rapid strength gain.

Not only does the mortar made with the cement of the present invention provide structural properties of 2500 psi after curing for one day, but sufficient strength for demolding is provided at much earlier times. For example, 1500 psi is normally required for removal of precast concrete forms, and this is frequently achieved in two hours, or less with the material of the present invention. Similarly, for cast in place concrete, a strength of 2000 psi is required for removal of shoring, and this is frequently obtained in four hours, or less.

In addition to the properties already recited, concretes formed in accordance with the present invention are durable, have superior freeze-thaw resistance without the use of air—entraining admixtures, have superior sulfate resistance, excellent resistance to abrasion and are more impermeable to moisture than other concretes and mortars. This latter property results in less moisture penetration and efflorescence.

While the prior art has shown the use of fly ash in cement compositions, absolutely none of this prior art has totally replaced the portland cement with fly ash as set forth in the present invention. For example, U.S. Pat. Nos. 4,640,715 and 4,642,137, Heitzmann, et al, assigned to the same assignee as the present invention, describe the use of a combination of portland cement and fly ash, along with an alkali metal activator and, optionally, some amount of citric acid. However, while the compositions of these patents are extremely valuable for the purposes disclosed, they do not disclose the possibility of totally eliminating the portland cement. U.S. Pat. Nos. 4,264,367, Schutz, and 3,856,541, Martin, also describe the use of an alkali metal activator and, possibly, citric acid, but never even disclose the use of fly ash. The chemical constituents and physical makeup of portland cement and of Class C fly ash are totally different, as can be observed from spectrographic data.

Two patents, U.S. Pat. Nos. 4,432,800, Kneller, et al, and Reissue 30,439, Nicholson, do describe the use of fly ash and an alkali metal material, but without citric acid. Further, it is quite clear that each of these patents is merely attempting to show a way to dispose of the waste fly ash material, and not to describe a product which allows its use, certainly not as a structural cement. The strengths achieved with the materials of Nicholson and Kneller et al clearly illustrate that the materials produced in accordance with these patents do not even approach necessary structural properties, as illustrated in the following comparative examples.

COMPARATIVE EXAMPLE 1

In accordance with this example, materials were prepared in accordance with the formulations disclosed in Nicholson, Reissue Patent 30,943. As will be seen from the three mixes, below, even after 28 days, the maximum strength obtained was 260 psi:

Strengths Obtained from Nicholson Formulations
Nicholson Patent 4,101,332 Reissue 30,943

Mix #1
8% Greencastle Cement Kiln Dust
12% Class C Fly Ash
80% Limestone Aggregate
0% Additions
10.8% Water Used
Compressive Strength at 4 hrs. = 110 psi.
Compressive Strength at 1 day = 220 psi.
Compressive Strength 7 day in air = 250 psi.
Compressive Strength 7 day in water = 310 psi.
Compressive Strength 28 day in air = 240 psi.
Compressive Strength 28 day in water = 430 psi.

Mix #2
Same as Mix #1 except:
0.8% Addition of $CaCl_2$
9.7% Water used
Compressive Strength at 4 hrs. = 50 psi.
Compressive Strength at 1 day = 170 psi.
Compressive Strength 7 day in air = 280 psi.
Compressive Strength 7 day in water = 250 psi.
Compressive Strength 28 day in air = 280 psi.
Compressive Strength 28 day in water = 350 psi.

Mix #3
8% Greencastle Cement Kiln Dust
8% Class C Fly Ash
84% Limestone Aggregate
9.9% Water Used
Compressive Strength at 4 hrs. = 70 psi.
Compressive Strength at 1 day = 210 psi.
Compressive Strength 7 day in air = 260 psi.
Compressive Strength 7 day in water = 240 psi.
Compressive Strength 28 day in air = 220 psi.
Compressive Strength 28 day in water = 260 psi.

COMPARATIVE EXAMPLE 2

In this example, formulations were made in accordance with Kneller, U.S. Pat. No. 4,432,800, in the same way as for the Nicholson et al formulations in comparative Example 1. The highest strength achieved, even in 28 days, was 570 psi, as shown in the following mixes 1 through 4:

Strengths Obtained from Kneller Formulations
Kneller Patent 4,432,800

Mix #1
8% Greencastle Cement Kiln Dust
8% Class C Fly Ash
84% Limestone Aggregate
1.14% Addition to CaO
11.0% Water used
Compressive Strength at 4 hrs. = SOFT
Compressive Strength at 1 day = 140 psi.
Compressive Strength 7 day in air = 250 psi.
Compressive Strength 7 day in water = 210 psi.
Compressive Strength 28 day in air = 240 psi.
Compressive Strength 28 day in water = 170 psi.

Mix #2
Same as Mix #1 except:
1.50% Addition of $Ca(OH)_2$
9.7% Water used
Compressive Strength at 4 hrs. = SOFT
Compressive Strength at 1 day = 150 psi.
Compressive Strength 7 day in air = 240 psi.
Compressive Strength 7 day in water = 230 psi.
Compressive Strength 28 day in air = 490 psi.
Compressive Strength 28 day in water = 280 psi.

Mix #3
Same as Mix #1 except:
0.50% Addition of CaO
8.8% Water used
Compressive Strength at 4 hrs. = SOFT
Compressive Strength at 1 day = 90 psi.
Compressive Strength 7 day in air = 130 psi.
Compressive Strength 7 day in water = 190 psi.
Compressive Strength 28 day in air = 180 psi.

-continued

| | |
|---|---|
| Compressive Strength 28 day in water = | 110 psi. |

Mix #4
Same as Mix #1 except:
1.50% Addition of CaO
9.3% Water Used

| | |
|---|---|
| Compressive Strength at 4 hrs. = | 20 psi. |
| Compressive Strength at 1 day = | 230 psi. |
| Compressive Strength 7 day in air = | 290 psi. |
| Compressive Strength 7 day in water = | 360 psi. |
| Compressive Strength 28 day in air = | 570 psi. |
| Compressive Strength 28 day in water = | 250 psi. |

While specific examples of the present invention have been shown and described, they should be considered as merely illustrative, and not as limiting, in any way, the full scope of the invention as set forth in the appended claims.

What is claimed as new is:

1. A hydraulic cement consisting essentially of, by weight the following cement forming constituents:
   from about 90.8 to 99 parts Class C fly ash
   from about 0.4 to 4.2 parts alkali metal activator
   from about 0.6 to 5 parts citric acid
   from about 0 to 3 parts set control materials, said alkali metal activator being selected from the class consisting of potassium hydroxide, potassium carbonate, sodium hydroxide, and sodium carbonate; and said admixture is at least one material selected from the class consisting of borax; a sodium salt of a copolymer of an unsaturated carboxylic acid and the hydroxyalkyl ester of such acid; a modified lignosulfonate, with catalyst; and a dispersion of sulfonated naphthalene formaldehyde condensate, a gluconate, and a lignosulfonate.

2. The hydraulic cement of claim 1 wherein the alkali metal activator is potassium hydroxide.

3. The hydraulic cement of claim 1 mixed with from 0.165 to 0.220 part water for each part of cement forming constituents.

4. The hydraulic cement of claim 3 wherein the amount of water is from 0.18 to 0.22 part.

5. A mortar formed from the hydraulic cement of claim 1 including sand in a ratio to cement forming constituents of 1.5-3.0:1.0.

6. The mortar of claim 5 wherein the ratio is 1.5-2.5:1.0.

7. The hydraulic cement of claim 1 having from 0.6 to 3.0 parts citric acid and from 1.0 to 2.9 parts potassium hydroxide.

8. The hydraulic cement of claim 1 having from 3.0 to 5.0 parts citric acid and from 0.4 to 3.8 parts potassium hydroxide.

9. A two part composition for hydraulic cement, wherein the two parts are blended prior to preparation of the cement, consisting essentially of by weight:
   a. a first part of from about 90.8 to 99 parts, Class C fly ash; and
   b. a second part containing:
      (1) from about 0.4 to 4.2 parts alkali metal activator
      (2) about 0.6 to 5 parts citric acid; and
      (3) about 0 to 3 parts admixture,
   wherein said alkali metal activator is selected from the class group consisting of potassium hydroxide, potassium carbonate, sodium hydroxide, and sodium carbonate; and said admixture is at least one material selected from the class consisting of borax; a sodium salt of a copolymer of an unsaturated carboxylic acid and the hydroxyalkyl ester of such acid; a modified lignosulfonate, with catalyst; and a dispersion of sulfonated naphthalene formaldehyde condensate, a gluconate, and a lignosulfonate.

10. The composition of claim 9 wherein the alkali metal activator is potassium hydroxide.

11. The composition of claim 9 mixed with from 0.165 to 0.220 part water for each part the hydraulic cement composition.

12. The composition of claim 11 wherein the amount of water is from 0.18 to 0.22 part.

13. A mortar formed from the composition of claim 9 including sand in a ratio to hydraulic composition of 1.5-3.0:1.0.

14. The mortar of claim 13 wherein the ratio is 1.5-2.5:1.0.

15. The composition of claim 9 having from 0.6 to 3.0 parts citric acid and from 1.0 to 2.9 parts potassium hydroxide.

16. The composition of claim 9 having from 3.0 to 5.0 parts citric acid and from 0.4 to 3.8 parts potassium hydroxide.

17. The composition of claim 9 wherein the alkali metal activator is potassium hydroxide.

18. A hydraulic cement comprising, by weight, approximately:
   96.29 parts Class C fly ash
   1.41 parts potassium hydroxide
   1.28 parts citric acid
   1.02 parts borax 19. A hydraulic cement comprising, by weight, approximately:
   95.98 parts Class C fly ash
   1.40 parts potassium hydroxide
   1.28 parts citric acid
   1.02 parts borax
   0.05 part sodium salt of a copolymer of an unsaturated carboxylic acid and the hydroxyalkyl ester of said acid 20. A hydraulic cement comprising, by weight, approximately:
   96.41 parts Class C fly ash
   1.28 parts potassium hydroxide
   1.28 parts citric acid
   1.03 parts borax 21. A hydraulic cement comprising, by weight, approximately:
   96.53 parts Class C fly ash
   1.16 parts potassium hydroxide
   1.28 parts citric acid
   1.03 parts borax 22. A hydraulic cement comprising, by weight, approximately:
   96.66 parts Class C fly ash
   1.03 parts potassium hydroxide
   1.28 parts citric acid
   1.03 parts borax 23. A hydraulic cement comprising, by weight, approximately:
   96.79 parts Class C fly ash
   0.90 part potassium hydroxide
   1.28 parts citric acid
   1.03 parts borax 24. A hydraulic cement comprising, by weight, approximately:
   94.95 parts Class C fly ash
   3.79 parts potassium carbonate
   1.26 parts citric acid

* * * * *